United States Patent
Huang et al.

(10) Patent No.: US 9,445,440 B2
(45) Date of Patent: Sep. 13, 2016

(54) METHOD FOR CONTROLLING WIRELESS NETWORK DEVICES AND CONTROL DEVICE WITH WIRELESS NETWORK FUNCTION

(71) Applicant: Chicony Electronics Co., Ltd., New Taipei (TW)

(72) Inventors: Wei-Cheng Huang, New Taipei (TW); Mei-Yi Tsai, New Taipei (TW); Shang-Yuan Yuan, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 217 days.

(21) Appl. No.: 14/062,852

(22) Filed: Oct. 24, 2013

(65) Prior Publication Data

US 2014/0192792 A1 Jul. 10, 2014

(30) Foreign Application Priority Data

Jan. 4, 2013 (TW) .............................. 102100269 A (51) Int. Cl.
*H04W 48/20* (2009.01)
*H04W 76/02* (2009.01)
*H04W 84/20* (2009.01)

(52) U.S. Cl.
CPC ............. *H04W 76/02* (2013.01); *H04W 48/20* (2013.01); *H04W 84/20* (2013.01)

(58) Field of Classification Search
CPC .... H04W 48/20; H04W 76/02; H04W 84/20
See application file for complete search history.

(56) References Cited

U.S. PATENT DOCUMENTS

| | | | |
|---|---|---|---|
| 6,795,421 B1* | 9/2004 | Heinonen | H04W 88/08 370/338 |
| 7,558,208 B2* | 7/2009 | Lin et al. | 370/238 |
| 7,586,867 B2* | 9/2009 | Lin | H04W 88/08 370/310 |
| 8,126,145 B1* | 2/2012 | Tewari | H04L 9/0841 370/401 |
| 8,194,599 B2* | 6/2012 | Marinier et al. | 370/329 |
| 8,363,617 B2* | 1/2013 | Meyer | 370/331 |
| 8,411,636 B2* | 4/2013 | Marinier et al. | 370/329 |

(Continued)

FOREIGN PATENT DOCUMENTS

| | | |
|---|---|---|
| JP | 2011-166353 A | 8/2011 |
| JP | 2012-090205 A | 5/2012 |
| JP | 2012-169971 A | 9/2012 |

OTHER PUBLICATIONS

Office Action for corresponding Japanese Patent Application No. 2013-191829, 3 pp., (Nov. 11, 2014).

(Continued)

*Primary Examiner* — Alpus H Hsu
(74) *Attorney, Agent, or Firm* — Blakely, Sokoloff, Taylor & Zafman LLP (57) ABSTRACT

The present invention discloses a method for controlling wireless network devices, which includes the following steps: a control device with a wireless network function is utilized to scan several access-point (AP) mode wireless network devices. One of the AP mode wireless network devices is selected as a master AP according to the scanning result. The at least one AP mode wireless network device other than the selected one is set to a client mode. The at least one wireless network device set to the client mode builds a connection to the control device with a wireless network function through the master AP. The present invention also discloses a control device with a wireless network function.

12 Claims, 5 Drawing Sheets

(56) References Cited

U.S. PATENT DOCUMENTS

| | | | |
|---|---|---|---|
| 8,547,870 B2* | 10/2013 | Curticapean | G01S 5/0257 370/252 |
| 8,811,349 B2* | 8/2014 | Deshpande et al. | 370/332 |
| 8,908,706 B2* | 12/2014 | Duo et al. | 370/401 |
| 9,014,087 B2* | 4/2015 | Gopalsamy | H04W 8/02 370/310.2 |
| 9,198,082 B2* | 11/2015 | Marinier | H04W 28/18 |
| 2005/0078624 A1* | 4/2005 | Shu | H04W 24/02 370/328 |
| 2006/0039360 A1* | 2/2006 | Thawani et al. | 370/352 |
| 2006/0268767 A1* | 11/2006 | Sato | H04W 28/20 370/328 |
| 2007/0189243 A1* | 8/2007 | Wang et al. | 370/338 |
| 2008/0101330 A1* | 5/2008 | Cheng | 370/350 |
| 2008/0186933 A1* | 8/2008 | Willman et al. | 370/338 |
| 2011/0162029 A1 | 6/2011 | Huang et al. | |
| 2012/0057503 A1* | 3/2012 | Ding et al. | 370/254 |
| 2012/0072522 A1* | 3/2012 | Sekino | H04L 61/103 709/208 |
| 2012/0170471 A1 | 7/2012 | Brown et al. | |
| 2012/0307645 A1 | 12/2012 | Grosman et al. | |
| 2015/0245305 A1* | 8/2015 | Camps Mur | H04W 56/00 370/350 |

OTHER PUBLICATIONS

Office Action for corresponding Taiwanese Patent Application No. 102100269, 6 pp., (Nov. 26, 2014).

Cerio Corporation, "DT-200N+ AP Client", 5 pp. (including English translation of Steps 5 and 6), (Dec. 31, 2011).

Cerio Corporation, "DT-200N: Wireless N-Series Streamlining", 11 pp. (including English translation of pp. 39-41, 62, and 65), (Dec. 31, 2011).

* cited by examiner

METHOD FOR CONTROLLING WIRELESS NETWORK DEVICES AND CONTROL DEVICE WITH WIRELESS NETWORK FUNCTION

RELATED APPLICATIONS

This application claims priority to Taiwanese Application Serial Number 102100269, filed Jan. 4, 2013, which is herein incorporated by reference.

BACKGROUND

1. Technical Field

The present invention relates to a method for controlling wireless network devices and a control device with a wireless network function applying the method.

2. Description of Related Art

A wireless network refers to any type of network formed by nodes without connection of cables, and, in general, the wireless network is combined with telecommunication networks. The wireless network is generally implemented with radio communication. This implementation takes place at the physical level (layer) of an OSI model network structure, such as CDMA2000, General Packet Radio Service (GPRS), Global System for Mobile Communications (GSM), Universal Mobile Telecommunications System (UTMS), Wireless Fidelity (Wi-Fi), Worldwide Interoperability for Microwave Access (WiMax) etc.

In that network services can be provided without cables, the wireless network becomes more and more popular. With the advent of the wireless network technology, data transmission rate available for the wireless network is enhanced. More and more devices are developed with capability of transmitting data through the wireless network, such as computers, personal digital assistants (PDAs), Digital Photo Frames (DPFs) and so on. Wireless network hardware has been becoming a must-have component in the most of new generation devices.

Figure 1:
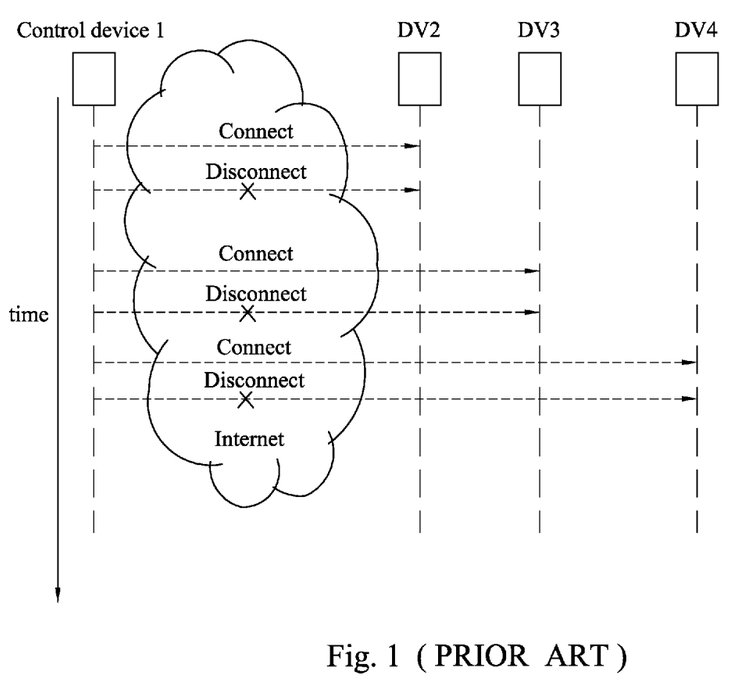
FIG. 1 is a flow diagram of a control device to control several wireless network device.

A common wireless network device (for example, a wireless network camera) may be defaulted to an access point (AP) mode. A user can operate a control device with a wireless network function (such as a personal computer) to connect to the wireless network device for control. However, most control devices can only connect to one single AP at a time. Hence, if a control device 1 is requested to control several wireless network devices DV2, DV3, DV4 set to the AP mode, the control device 1 has to repeatedly connect and disconnect to the wireless network devices DV2, DV3, DV4 (as shown in FIG. 1), which is resource-consuming, to respectively control these devices. In addition, it is a disturbing problem for users to set local area networks (LANs) for the control device and these AP mode wireless network devices.

SUMMARY

The specific task of the present invention is to help users setting a LAN without manually inputting the wireless AP profile to the wireless network devices, thereby users can control multiple wireless network devices without repeatedly connecting and disconnecting. According to one embodiment of this invention, a method for controlling wireless network devices is disclosed to select one of detected access-point (AP) mode wireless network devices to maintain the AP mode, and set any other one to the client mode for control or operation. The method for controlling wireless network devices includes the following steps:

(a) A control device with a wireless network function is utilized to scan several AP mode wireless network devices.

(b) One of the AP mode wireless network devices is selected as a master AP according to the scanning result of step (a).

(c) The at least one AP mode wireless network device other than the selected one is set to a client mode.

(d) The at least one wireless network device set to the client mode is driven to build a connection to the control device with a wireless network function through the master AP.

According to another embodiment of this invention, a control device with a wireless network function is disclosed to select one of detected AP mode wireless network devices to maintain the AP mode, and set others to the client mode for control or operation. The control device with a wireless network function includes a wireless network module and a processing unit, which are electrically connected with each other. The processing unit includes a scanning module, a selecting module and a connection-building module. The scanning module drives the wireless network module to scan several AP mode wireless network devices through a wireless network to generate a scanning result. The selecting module selects one of the AP mode wireless network devices as a master AP according to the scanning result. The connection-building module sets the at least one AP mode wireless network device other than the selected one to a client mode and drives the at least one wireless network device set to the client mode to build a connection to the control device with a wireless network function through the master AP.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 2:
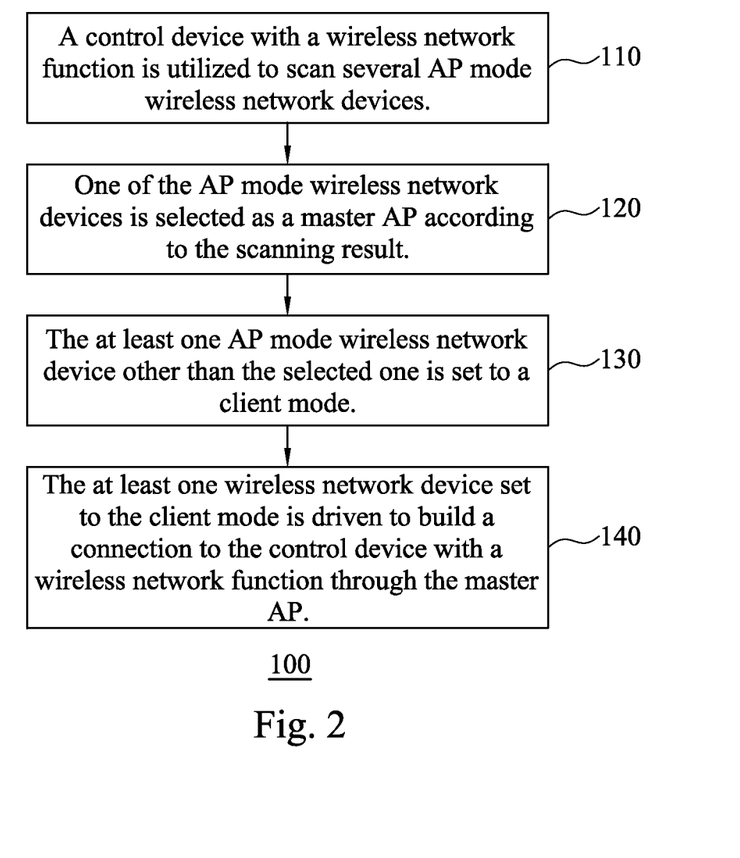
FIG. 2 is a flow diagram of a method for controlling wireless network devices according to one embodiment of this invention.
Figure 3:
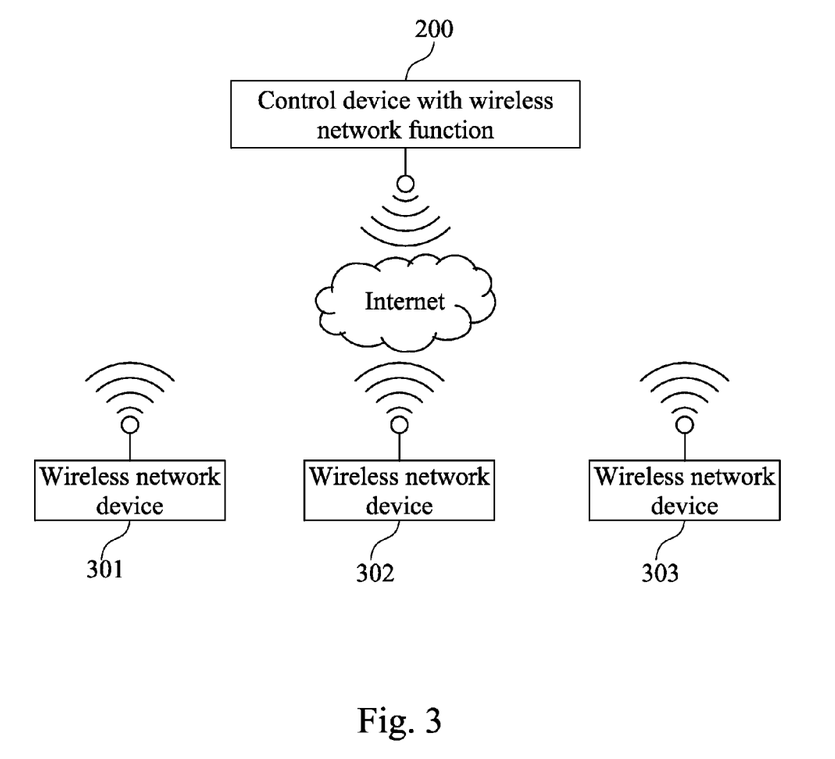
FIG. 3 illustrates a system applying the method for controlling wireless network devices.

FIG. 2 is a flow diagram of a method for controlling wireless network devices according to one embodiment of this invention. FIG. 3 illustrates a system applying the method for controlling wireless network devices. Refer to both FIG. 2 and FIG. 3. In the method for controlling wireless network devices, one of detected access-point (AP) mode wireless network devices is selected to maintain the AP mode, and any other one is set to the client mode and connects to the one maintaining the AP mode. The method for controlling wireless network devices may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs), digital versatile disc read only memories (DVD-ROMs), and Blu-ray Disc read only memories (BD-ROMs); magnetic storage devices such as hard disk drives (HDDs) and floppy disk drives; and solid-state disks (SSDs).

The method 100 for controlling wireless network devices includes the following steps:

At step 110, a control device 200 with a wireless network function is utilized to perform scanning to detect several AP mode wireless network devices 301, 302, 303. The control device 200 with a wireless network function may be a personal computer (PC), a laptop computer, a server, a mobile phone, or any other type of electrical device with a wireless network function. The AP mode wireless network devices 301, 302, 303 are the devices under AP mode to provide services as APs.

At step 120, one of the AP mode wireless network devices 301, 302, 303 is selected as a master AP (also known as a Super AP) according to the scanning result of step 110. In this embodiment, we assume that the AP mode wireless network device 301 is selected as the master AP at step 120.

At step 130, the at least one AP mode wireless network device other than the selected one 301 is set to a client mode. In this embodiment, the wireless network devices 302, 303 are set to a client mode, such that the wireless network devices 302, 303 cannot provide services as APs after being set.

Figure 4:
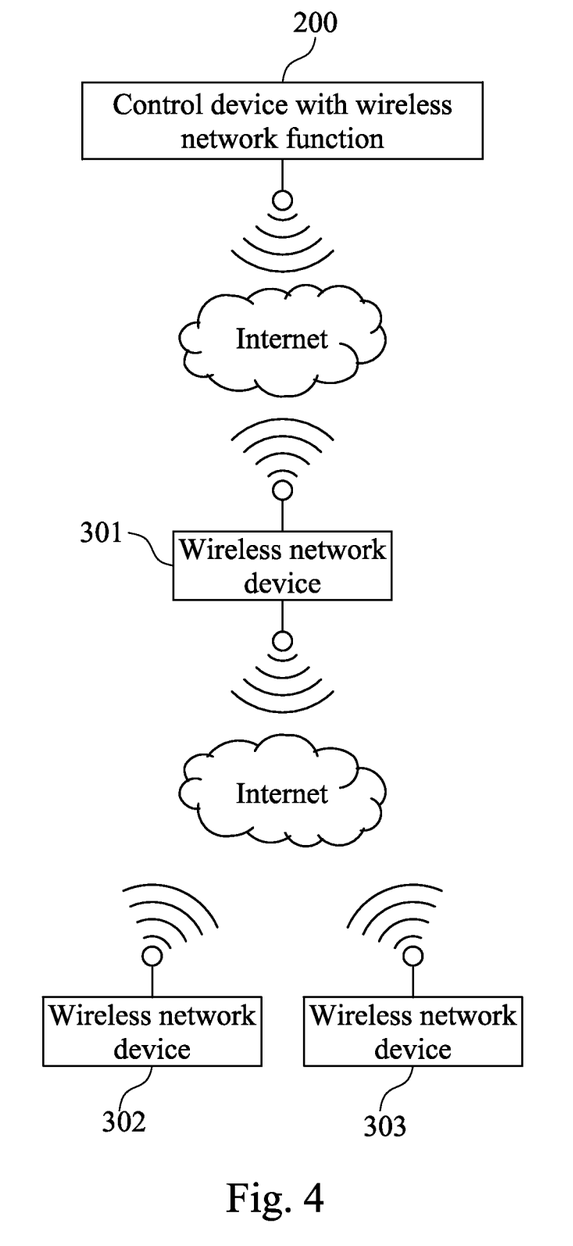
FIG. 4 illustrates a block diagram of a local area network (LAN)

At step 140, the at least one wireless network device set to the client mode (for example, the wireless network device 302 or 303) is driven to build a connection to the control device 200 with a wireless network function through the master AP 301. Subsequently, the control device 200 with a wireless network function can control or operate the wireless network devices 301, 302, 303 through the master AP 301. In this embodiment, the control device 200 with a wireless network function may connect to the wireless network device 302 to set it to the client mode and to transmit an instruction to make it connect to the master AP 301, and then disconnect after setting. The control device 200 with a wireless network function may also connect to the wireless network device 303 to perform the above steps for setting. In some embodiments, when the master AP 301 support operating in the client mode and the AP mode simultaneously, the master AP 301 may respectively connect to the AP mode wireless network devices 302, 303 to make the wireless network devices 302, 303 set to (enable) the client mode, and then to drive the wireless network devices 302, 303 to connect to the master AP (wireless network device 301). Therefore, the control device 200 with a wireless network function and the wireless network devices 301, 302, 303 form a local area network (LAN), and the connection in this LAN is shown in FIG. 4. Then, the control device 200 with a wireless network function can operate the wireless network devices 301, 302, 303 in the same LAN at the same time. In other words, the control device 200 with a wireless network function does not have to switch to different wireless network devices for controlling or operating thereof, which can simplify the steps for connections. For example, the control device 200 with a wireless network function can operate the wireless network device 301 directly, and can also operate the wireless network devices 302, 303 through the master AP 301 without performing disconnections. In some embodiments, a user can select the wireless network device(s) to connect to the master AP for being operated or controlled.

In addition, in some embodiments of this invention, the control device 200 with a wireless network function can obtain the connection related information about connecting to the wireless network devices 302, 303 from the master AP (wireless network device 301) since the wireless network devices 302, 303 are under the LAN where the wireless network device 301 acting as the master AP. Then, the control device 200 with a wireless network function can control or operate the wireless network devices 302, 303 according to their connection related information. In some embodiments, the control device 200 with a wireless network function can be a smart phone, a computer or any other electrical device with a wireless network function. In addition, the wireless network devices 301, 302, 303 can be Wi-Fi digital video (DV) devices, Internet Protocol (IP) cameras, other types of wireless network devices, or combination thereof. When the wireless network devices 301, 302, 303 are video/photo capturing devices (such as Wi-Fi DVs, IP cameras, etc.), the control device 200 with a wireless network function can receive videos or photos captured by the wireless network devices 301, 302, 303 and control video/photo capturing functions of the wireless network devices 301, 302, 303.

In some embodiments of step 110, detected-device number of each AP mode wireless network device 301, 302, 303 can be obtained during the scanning process. Each detected-device number represents the number of devices detected by each AP mode wireless network device 301, 302, 303. Then, one of the AP mode wireless network devices 301, 302, 303 is selected as a master AP according to the detected-device numbers of the AP mode wireless network devices 301, 302, 303 at step 120. For example, if the wireless network device 301 can detect the wireless network devices 302, 303, the detected-device number of the wireless network device 301 is "2"; if the wireless network device 302 can only detect the wireless network device 303, the detected-device number of the wireless network device 302 is "1"; if the wireless network device 303 can only detect the wireless network device 302, the detected-device number of the wireless network device 303 is "1". Hence, in this example, the AP mode wireless network device with the maximal detected-device number is 301, which is, as a result, selected as the master AP at step 120.

In another embodiment of step 110, connection-related information of each AP mode wireless network device 301, 302, 303 can be obtained during the scanning process. Then, the connection-related information of the AP mode wireless network devices 301, 302, 303 is taken as basis for selecting at step 120. The connection-related information of the AP mode wireless network devices 301, 302, 303 may include their signal strength, communication-channel information, information for connecting to Internet, or combination thereof. Accordingly, in some embodiments of step 120, one of the AP mode wireless network devices 301, 302, 303 is selected as a master AP according to a factor among the connection-related information of the AP mode wireless network devices 301, 302, 303. In some other embodiments of step 120, weight calculation may be performed over several factors among the connection-related information of the AP mode wireless network devices 301, 302, 303 as basis for selecting at step 120. For example, weight "50%" may be assigned to both the signal strength and the detected-device numbers of the AP mode wireless network device 301, 302, 303 for the weight calculation. Besides, the method 100 for controlling wireless network devices may further include the following steps: a connection profile for connecting to the master AP (wireless network device 301) may be obtained. The connection profile is transmitted to the at least one AP mode wireless network device other than the selected one (for example, wireless network devices 302, 303). If the master AP (wireless network device 301) supports operating in the client mode and the AP mode simultaneously, the master AP (wireless network device 301) may utilize the client mode to connect to the AP mode wireless network devices 302, 303 for transmitting the connection profile. Subsequently, after the wireless network devices 302, 303 are set to the client mode, they can build a connection to the master AP (wireless network device 301) according to the connection profile. When the wireless network devices 302, 303 set to the client mode connect to the master AP (wireless network device 301), they can build a connection to the control device 200 with a wireless network function through the master AP 301 (step 140). In some other embodiments, if there is only one AP mode wireless network device other than the selected one, steps for building a connection to the control device 200 with a wireless network function (step 140) are as disclosed above.

In some embodiments of the method 100 for controlling wireless network devices, a first selection signal may be received through an input unit of the control device with a wireless network function for performing the selection at step 120. The input unit of the control device with a wireless network function may be a mouse, a keyboard, a touch screen, a graphical user interface (GUI) or any other type of input unit. In addition, a second selection signal may be received through the input unit of the control device with a wireless network function for selecting one of the AP mode wireless network devices to set to the client mode and to connect to the master AP. Therefore, a user can operate the input unit to select the master AP and the wireless network device to set to the client mode.

In some embodiments of the method 100 for controlling wireless network devices, when the control device 200 with a wireless network function detects a new AP mode wireless network device during the scanning, the control device 200 with a wireless network function can transmit the connection profile for connecting to the master AP 301 to the new detected AP mode wireless network device and request it to set to the client mode. Therefore, the new detected wireless network device can connect to the master AP 301 after being set to the client mode, and can build a connection to the control device 200 with a wireless network function through the master AP 301 (step 140).

In some other embodiments of the method 100 for controlling wireless network devices, when the control device 200 with a wireless network function detects a new AP mode wireless network device during the scanning, steps 110-140 may be triggered to perform the selection of the master AP from the wireless network device 301 and the new detected AP mode wireless network device.

Figure 5:
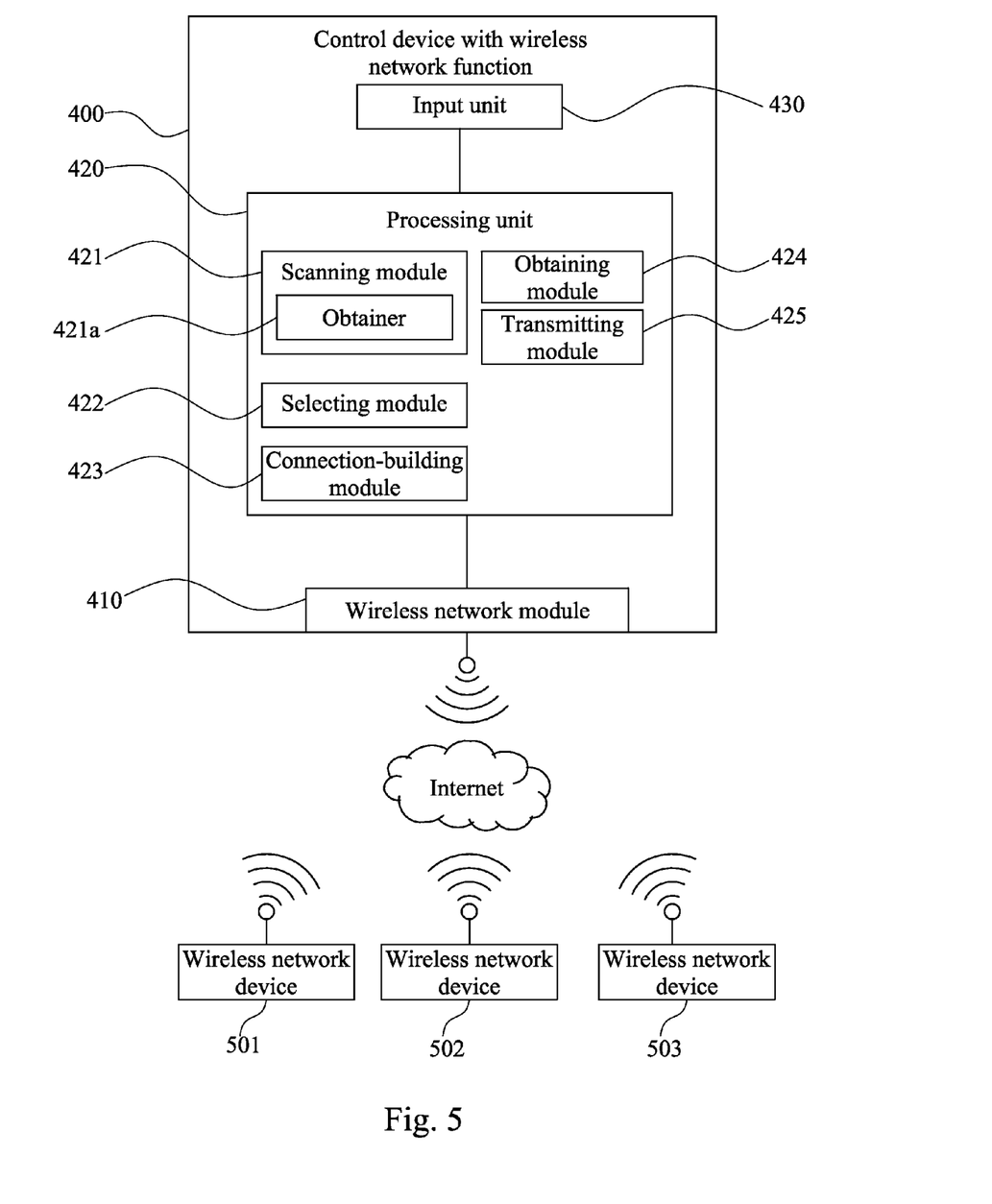
FIG. 5 illustrates a block diagram of a control device with a wireless network function according to one embodiment of this invention.

Referring to FIG. 5, a block diagram will be described that illustrates a control device with a wireless network function according to one embodiment of this invention. The control device with a wireless network function selects one of detected AP mode wireless network devices to maintain the AP mode, and set any other one to the client mode for control or operation.

The control device 400 with a wireless network function includes a wireless network module 410 and a processing unit 420, which are electrically connected with each other. The wireless network module 410 can connect to a wireless network through a wireless network communication protocol. The wireless network module 410 may include an antenna for connecting to the wireless network.

The processing unit 420 may be a central processing unit (CPU), a control unit or any other type of processing unit. In some embodiments, the processing unit 420 may read a computer program product stored on a non-transitory computer-readable storage medium to perform functions of elements among the processing unit 420. The processing unit 420 includes a scanning module 421, a selecting module 422 and a connection-building module 423. The scanning module 421 drives the wireless network module 410 to perform scan to detect several AP mode wireless network devices 501, 502, 503 through the wireless network to generate a scanning result. In some embodiments, the scanning module 421 may drive the wireless network module 410 to keep scanning to receive AP identification information, such as service set identifier (SSID), and the AP mode wireless network devices 501, 502, 503 may be detected through the above mentioned scanning process.

The selecting module 422 selects one of the AP mode wireless network devices 501, 502, 503 as a master AP according to the scanning result. In this embodiment, we assume that the selecting module 422 selects the wireless network device 501 as the master AP.

The connection-building module 423 connects to the AP mode wireless network devices 502, 503 other than the selected one (wireless network device 501) to set them to a client mode. In addition, if the wireless network devices 502, 503 support operating in the client mode and the AP mode simultaneously, the wireless network devices 502, 503 can be set to both the client mode and the AP mode. Then, the connection-building module 423 drives the wireless network devices 502, 503 to build a connection to the control device 400 with a wireless network function through the master AP (wireless network device 501). Subsequently, the control device 400 with a wireless network function can control or operate the wireless network devices 501, 502, 503 through the master AP (wireless network device 501). Therefore, the control device 400 with a wireless network function, the wireless network devices 501, 502, 503 form a LAN (or called "are under a same LAN"), such that the control device 400 with a wireless network function can operate the wireless network devices 501, 502, 503 in the same LAN at the same time. In other words, the control device 400 with a wireless network function does not have to switch to different wireless network devices (or called "switch to different LANs") for controlling or operating thereof, which can simplify the steps for connections. In some embodiments of this invention, the control device 400 with a wireless network function can obtain the connection related information about connecting to the wireless network devices 502, 503 from the master AP (wireless network device 501) since the wireless network devices 502, 503 are under the LAN where the wireless network device 501 acting as the master AP. Then, the control device 400 with a wireless network function can control or operate the wireless network devices 502, 503 according to their connection related information.

In some embodiments of this invention, an obtainer 421*a* of the scanning module 421 can obtain detected-device number of each AP mode wireless network device 501, 502, 503. Each detected-device number represents the number of devices detected by each AP mode wireless network device 501, 502, 503. The selecting module 422 selects the one with the maximal detected-device number as the master AP.

In some embodiments of this invention, the obtainer 421*a* of the scanning module 421 can obtain connection-related information of each AP mode wireless network device 501, 502, 503. The selecting module 422 performs selection according to the connection-related information of each AP mode wireless network device 501, 502, 503. The connection-related information of the AP mode wireless network devices 501, 502, 503 may include their signal strength, communication-channel information, information for connecting to Internet, any other type of connection-related information or combination thereof. Accordingly, in some embodiments of this invention, the selecting module 422 may perform selection according to a factor among the connection-related information of the AP mode wireless network devices 501, 502, 503. In some other embodiments of this invention, the selecting module 422 may perform weight calculation over several factors among the connection-related information of the AP mode wireless network devices 501, 502, 503 as basis for performing selection of the master AP.

In addition, the processing unit 420 may further include an obtaining module 424 and a transmitting module 425. The obtaining module 424 drives the wireless network module 410 to obtain a connection profile for connecting to the master AP (wireless network device 501) through the wireless network. The transmitting module 425 transmits the connection profile to the AP mode wireless network devices (for example, 502, 503) other than the selected one (501). After set to the client mode, the wireless network devices 502, 503 can build a connection to the master AP (wireless network device 501) according to the connection profile. In some other embodiments, if there is only one AP mode wireless network device other than the selected one, steps for building a connection to the master AP (wireless network device 501) are as disclosed above.

In some embodiments, the control device 400 with a wireless network function may further include an input unit 430 electrically connected with the processing unit 420. The input unit 430 may be a mouse, a keyboard, a touch screen, a graphical user interface (GUI) or any other type of input unit. A first selection signal may be received through the input unit 430 for the selecting module 422 to perform the selection. In addition, a second selection signal may be received through the input unit 430 for the processing unit 420 to select one of the AP mode wireless network devices 501, 502, 503 to set to the client mode and to connect to the master AP. Therefore, a user can operate the input unit 430 to select the master AP and the wireless network device to set to the client mode.

In addition, the control device 400 with a wireless network function may keep detecting if there is any other new AP mode wireless network device. In one embodiment of this invention, when the control device 400 with a wireless network function detects a new AP mode wireless network device during the scanning, the control device 400 with a wireless network function can transmit the connection profile for connecting to the master AP 501 to the new detected AP mode wireless network device and request it to set to the client mode. Therefore, the new detected wireless network device can connect to the master AP 501 after being set to the client mode, and can build a connection to the control device 400 with a wireless network function through the master AP 501.

In some other embodiments of this invention, when the control device 400 with a wireless network function detects a new AP mode wireless network device during the scanning, the scanning module 421, the selecting module 422 and the connection-building module 423 may be re-triggered to select the master AP from the wireless network device 301 and the new detected AP mode wireless network device.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for controlling wireless network devices comprising:
   (a) scanning a plurality of access-point mode (AP mode) wireless network devices by utilizing a control device with a wireless network function to obtain a detected-device number of each AP mode wireless network device, wherein the detected-device number represents the number of AP mode wireless network devices detected by each AP mode wireless network device;
   (b) selecting one of the AP mode wireless network devices as a master AP, wherein the AP mode wireless network device with a maximal detected-device number is selected as the master AP;
   (c) setting at least one of the AP mode wireless network devices that are non-selected to a client mode; and
   (d) driving the at least one AP mode wireless network device that is set to the client mode to build a connection to the control device with the wireless network function through the master AP,
   wherein the control device obtains a connection setting profile for connecting to the master AP, and
   wherein when a new AP mode wireless network device is detected by the control device, the control device transmits the connection setting profile to the new AP mode wireless network device, and the control device sets the new AP mode wireless network device to the client mode.

2. The method for controlling wireless network devices of claim 1 further comprising:
   transmitting the connection setting profile to the at least one of the AP mode wireless network devices that are non-selected; and
   driving the at least one AP mode wireless network device that is set to the client mode to build a connection to the master AP according to the connection setting profile.

3. The method for controlling wireless network devices of claim 2 further comprising:

when the master AP is capable of operating in the client mode and an AP mode simultaneously, driving the master AP to build a connection with the at least one of the AP mode wireless network devices that are non-selected for transmitting the connection setting profile.

4. The method for controlling wireless network devices of claim 1, wherein operation (a) further comprises:
   obtaining connection-related information of each AP mode wireless network device.

5. The method for controlling wireless network devices of claim 4, wherein the connection-related information of each AP mode wireless network device comprises a signal strength, a communication-channel information or an Internet connection information.

6. The method for controlling wireless network devices of claim 1 further comprising:
   when the at least one of the AP mode wireless network devices that are non-selected is capable of operating in the client mode and an AP mode simultaneously, driving the at least one of the AP mode wireless network devices that are non-selected to set to the client mode with the AP mode enabled.

7. The method for controlling wireless network devices of claim 1 further comprising:
   according to a first selection signal through an input unit of the control device with the wireless network function for performing the selection at operation (b); and
   according to a second selection signal through the input unit of the control device with the wireless network function for selecting one of the AP mode wireless network devices to set to the client mode and to connect to the master AP.

8. A control device with a wireless network function comprising: a wireless network module; and
   a processing unit electrically connected with the wireless network module, wherein the processing unit comprises:
   a scanning module configured to drive the wireless network module to scan a plurality of access-point mode (AP mode) wireless network devices through a wireless network to generate a scanning result, wherein the scanning module comprises:
   an obtainer configured to obtain a detected-device number of each AP mode wireless network device, wherein the detected-device number represents the number of AP mode wireless network devices that is detected by each AP mode wireless network device;
   a selecting module configured to select one of the AP mode wireless network devices as a master AP according to the scanning result, wherein the selecting module selects the AP mode wireless network device with a maximal detected-device number as the master AP;
   an obtaining module configured to drive the wireless network module to obtain a connection setting profile for connecting to the master AP through the wireless network; and a connection-building module configured to set the at least one of the AP mode wireless network devices that are non-selected to a client mode and to drive the at least one AP mode wireless network device that is set to the client mode to build a connection to the control device with the wireless network function through the master AP according to the connection setting profile,
   wherein when a new AP mode wireless network device is detected by the processing unit, the processing unit transmits the connection setting profile to the new AP mode wireless network device, and the processing unit sets the new AP mode wireless network device to the client mode.

9. The control device with a wireless network function of claim 8, wherein the processing unit further comprises:
   a transmitting module configured to transmit the connection setting profile to the at least one of the AP mode wireless network devices that are non-selected,
   wherein the at least one AP mode wireless network device that is set to the client mode builds a connection to the master AP according to the connection setting profile.

10. The control device with a wireless network function of claim 8, wherein the obtainer is configured to obtain connection-related information of each AP mode wireless network device, wherein the selecting module performs selection according to the connection-related information of each AP mode wireless network device.

11. The control device with a wireless network function of claim 10, wherein the connection-related information of each AP mode wireless network device comprises a signal strength, a communication-channel information or an Internet connection information.

12. The control device with a wireless network function of claim 8 further comprising an input unit electrically connected with the processing unit,
   wherein a first selection signal is received through the input unit for the selecting module to perform the selection,
   wherein a second selection signal is received through the input unit for the processing unit to select one of the AP mode wireless network devices to set to the client mode and to connect to the master AP.

* * * * *